United States Patent [19]
Hansen

[11] Patent Number: 5,223,088
[45] Date of Patent: Jun. 29, 1993

[54] APPARATUS FOR PRODUCING CONCENTRATED AQUEOUS SLURRIES AND SPRAY DRIED PARTICULATE PRODUCTS

[75] Inventor: Ove E. Hansen, Allerod, Denmark

[73] Assignee: NIRO A/S, Soeborg, Denmark

[21] Appl. No.: 774,917

[22] Filed: Oct. 11, 1991

Related U.S. Application Data

[63] Continuation-in-part of Ser. No. 656,269, Feb. 15, 1991.

[51] Int. Cl.$^5$ .......................... B01D 1/18; B01D 3/06
[52] U.S. Cl. .................................... 159/2.1; 159/2.3;
  159/4.02; 159/4.1; 159/46; 159/48.1;
  159/DIG. 25; 159/DIG. 28; 159/DIG. 32;
  34/57 A
[58] Field of Search ............... 159/4.02, 4.06, 4.01,
  159/4.1, 4.2, 2.1, 2.3, 46, 24.1, DIG. 32, DIG.
  27, DIG. 28, DIG. 25, 48.1; 202/173; 203/88;
  34/57 A, 57 R

[56] References Cited
U.S. PATENT DOCUMENTS

| | | | |
|---|---|---|---|
| 1,799,478 | 4/1931 | Peebles | 159/2.3 |
| 2,189,083 | 2/1940 | Renkin | 159/4.02 |
| 2,815,292 | 12/1957 | Thiele | 501/150 |
| 3,024,228 | 3/1962 | McLeod | 159/DIG. 25 |
| 3,216,481 | 11/1965 | Henze | 159/DIG. 25 |
| 3,557,864 | 1/1971 | Berg | 159/4.02 |
| 4,171,243 | 10/1979 | Brooks et al. | 159/4.02 |
| 4,473,438 | 9/1984 | Loureiro | 159/4.02 |
| 4,642,904 | 2/1987 | Smith | 34/9 |
| 4,687,546 | 8/1987 | Willis | 159/2.1 |
| 4,896,436 | 1/1990 | Iwaya et al. | 159/DIG. 28 |

Primary Examiner—Wilbur Bascomb, Jr.
Attorney, Agent, or Firm—Armstrong, Westerman, Hattori, McLeland & Naughton

[57] ABSTRACT

An improved process and apparatus for producing concentrated kaolin slurries and spray dried kaolin particulates through the use of an arrangement where a system for producing concentrated slurries is coupled with a spray dryer such that off gases from the spray dryer are used to supply heat energy to the spray dryer and to the slurry concentrating system.

10 Claims, 10 Drawing Sheets

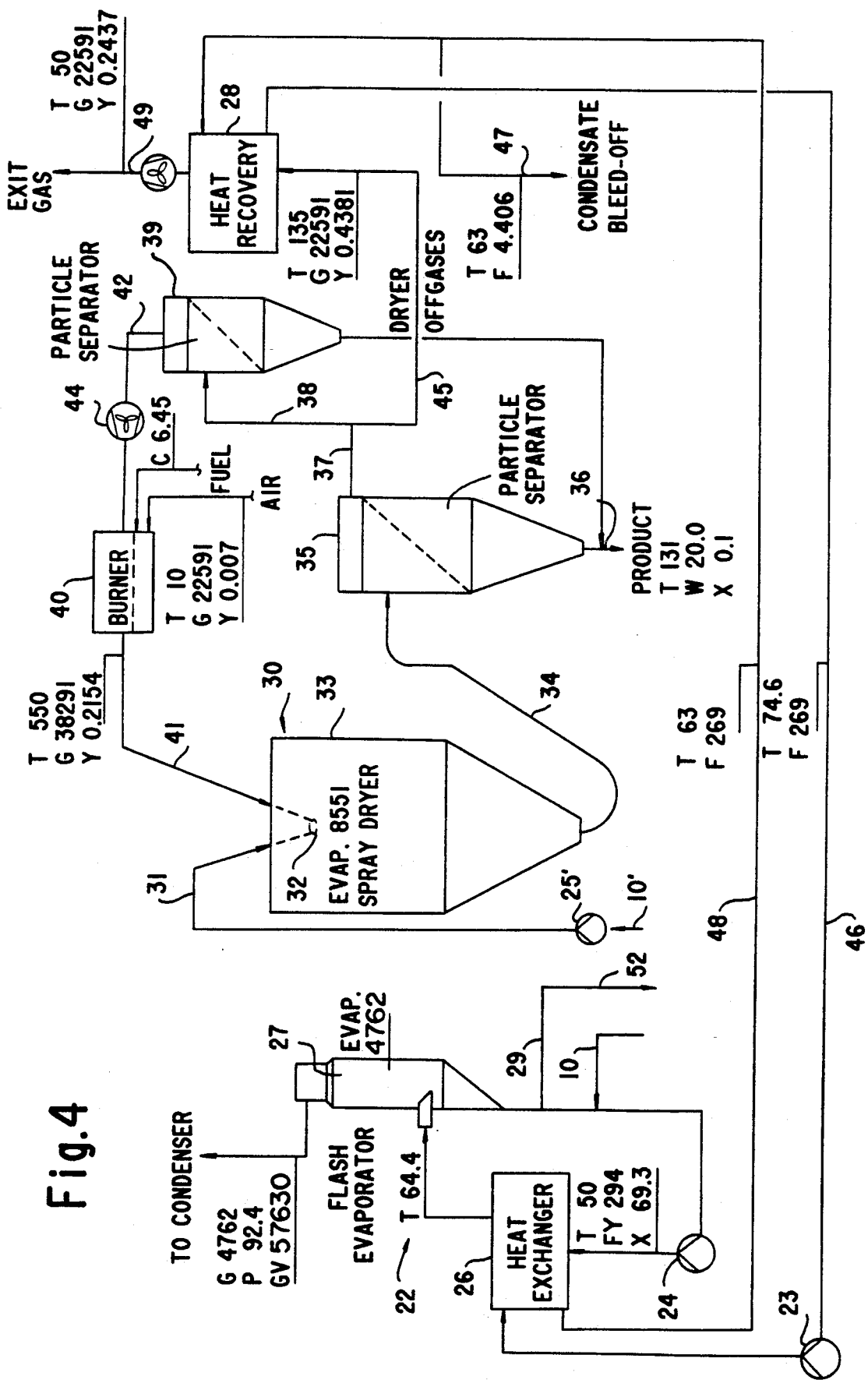

APPARATUS FOR PRODUCING CONCENTRATED AQUEOUS SLURRIES AND SPRAY DRIED PARTICULATE PRODUCTS

This application is a continuation-in-part of application Ser. No. 656,269, filed on Feb. 15, 1991.

FIELD OF THE INVENTION

This invention is directed to an improved process and apparatus for producing concentrated mineral bearing aqueous slurries and particulate products obtained by spray drying such slurries. More specifically, the present invention provides a novel method and apparatus for producing concentrated aqueous slurries and spray dried particulate products, especially kaolin clay particulates, which significantly reduces the amount of energy required in the process and enhances operation of the production facility.

The present invention provides an improved process and means for producing concentrated kaolin slurries and spray dried kaolin particulates through the use of an arrangement where a non-evaporative system and an evaporation system for producing concentrated slurries are coupled with a spray dryer such that off gases from the spray dryer are used to supply heat energy to the spray dryer and to a non-evaporative system for concentrating a feed slurry as well as to an evaporation system for further concentrating the feed slurry. In one aspect, the invention relates to means whereby the dew point and the heat content of the spray dryer off gases are increased such that the temperature of the evaporating system can be increased, the volume of slurry circulation decreased and the area of heat exchangers reduced. In another aspect, the invention relates to enhancing the concentration of a feed slurry by providing a non-evaporative slurry concentration system and heating a slurry with thermal energy recovered from spray dryer exhaust gases before the slurry enters the non-evaporative system. In still another aspect, the invention relates to means for reducing or eliminating the oxygen content of the spray dryer gases. In still a further aspect, the invention relates to improved means whereby concentrated kaolin slurries and spray dried kaolin products are produced while minimizing heat consumption and energy by recycling part of the spray dryer off gases to the spray dryer as a source of heat and utilizing part of the spray dryer off gases for heating a fluid providing a source of heat to the evaporative system.

BACKGROUND OF THE INVENTION

Kaolin clay was one of the first inorganic materials to be dried commercially on a large scale using spray dryers. To prepare pure kaolin for the paper, paint, plastics, rubber, and ceramic industries, crude kaolin from a mine is milled, crushed, and then slurried with water and chemical dispersants. A fine clay slip containing about 25% solids is formed. The slip is flocculated with acid, further chemically treated to improve its quality, centrifuged and then filtered to obtain a slurry of about 60% solids content. In conventional processing the 60% slurry is spray dried to produce a particulate product containing less than one percent free moisture and about 14% crystal bound water.

Two main products dominate the current kaolin product market. The first is a dry particulate product and the second is a near 70% solids content kaolin slurry. Individual customer preference for these products depends on factors which are not relevant to the present invention. However, it is essential that a kaolin supplier be capable of producing near 70% slurries and dry products at minimum cost.

Since the production of these products is accomplished by removing water from the kaolin clay slurries, and since this is accomplished by heating and evaporating water from the raw product, the amount of heat required to operate such a process is of primary concern to manufacturers of these products. Therefore, a number of different techniques have been previously considered to save energy.

U.S. Pat. No. 1,746,294 discloses a process for the continuous calcination of gypsum wherein waste heat from a preheater furnace may be put into a steam jacket surrounding a calcinating chamber or used to heat steam supplied to the jacket.

U.S. Pat. No. 4,246,039 discloses a kaolin clay process wherein a suspension of hydrated kaolin fed to an electrofilter is preheated by direct heat exchange with hot gases from a clay calciner used to remove water of hydration from the kaolin.

It is also known to utilize calciner off gases to supply heat to a spray dryer. For example, U.S. Pat. No. 3,776,688 describes the operation of a rotating kiln plant for producing cement according to a wet process. The capacity of the kiln is increased, and heat economy improved, by drying part of the cement slurry in a spray dryer and introducing the spray dried material into the kiln. The spray drying is performed using exhaust gases from the kiln in an integrated operation.

U.S. Pat. No. 2,815,292 discloses a method for dewatering clay wherein waste gases from a dryer are delivered to a heat exchanger for heating a cold clay slip prior to dewatering.

U.S Pat. No. 4,642,904 describes a process for drying a clay slurry which includes: dewatering an aqueous clay slurry by filtration, contacting the partially dewatered slurry with hot drying gases in an evaporative dryer, condensing part of the evaporated water and using the condensate to preheat aqueous clay slurry before and after being filtered.

U.S. Pat. No. 4,687,546 describes a method for concentrating a kaolin slurry whereby a beneficiated clay slurry is concentrated by evaporating water from the slurry by passing the slurry through one or more non-contact evaporative heat exchangers.

U.S. Pat. Nos. 4,717,559 and 4,962,279 disclose a kaolin calciner waste heat and feed recovery system wherein hot exhaust gas from the calciner is added to and delivered with a hot air stream from a combustor to a spray drier. Hot gases from the spray dryer may also be used to heat water in a scrubber and the heated water is used to heat the feed to a filtration process.

Notwithstanding the various efforts and techniques to conserve energy in the production of concentrated slurries and spray dried particulate products, as will be more fully described below, none of the prior techniques considered the process and apparatus of the present invention or provided the degree of savings and enhanced production of the present invention.

SUMMARY OF THE INVENTION

One object of this invention is to provide an improved process for concentrating kaolin slurries and producing dry kaolin particulate products which includes, a single or multistage evaporation system where a feed slurry is delivered to at least one non-evaporative heat transfer surface and then to a flash chamber. The evaporation system is used in combination with a spray dryer and part of the off gases from the spray dryer are recycled to the spray dryer to substitute for part of the cold air intake to the spray dryer heat source and a second part of the off gases from the spray dryer are used as a source of heat to the slurry concentrating evaporation system.

Another object of this invention is to provide improved means for simultaneously concentrating solids in an aqueous slurry by evaporating water therefrom that includes at least one non-evaporative heat transfer surface followed by a flash chamber where the aqueous slurry is passed first to the non-evaporative heat transfer surface for heating under sufficient pressure to maintain a liquid state and then to the flash chamber. The concentrated slurry is spray dried to produce a particulate product, or taken in part as concentrated slurry product, or in part recycled to the non-evaporative heat exchanger. Off gases from the spray dryer are, in part, used as a source of heat for the aqueous slurry concentrator. Part of the spray dryer off gases are also recycled to the spray dryer as a source of heat.

It is a further object of this invention to provide improved means for simultaneously producing concentrated slurries and spray dried solids from an aqueous slurry by evaporating water therefrom which includes at least two non-evaporative heat exchanger and flash chamber assemblies wherein a slurry product of the first heat exchanger and flash chamber assembly is passed to a second non-evaporative heat exchanger that may be heated optionally by recompressed vapor from the first or second stage assembly and/or by heat recovered from spray dryer off gases or live steam. The heated slurry issuing from the second non-evaporative heat exchanger is then delivered to a flash chamber water vapor separator. Concentrated slurry product from the second flash chamber is taken as feed to the spray dryer or, may be taken in part, as a concentrated slurry product.

It is a still further object of this invention to provide at reduced equipment cost, improved means for simultaneously producing concentrated slurries and spray dried solids contained in an aqueous slurry by evaporating water from the slurry which includes more than one non-evaporative heat exchanger and flash chamber assemblies wherein a slurry product of a first heat exchanger and flash chamber assembly is passed to a second non-evaporative heat exchanger that may be heated optionally by recompressed vapor from the first stage assembly and/or by heat recovered from the spray dryer off gases. The heated slurry issuing from the second non-evaporative heat exchanger is passed to a flash chamber water vapor separator. Concentrated slurry product from the second flash chamber is taken as feed to the spray dryer or, may be taken in part as a concentrated slurry product.

It is another object of this invention, when used in a process for the production of concentrated kaolin slurries and spray dried kaolin particulates, to provide means whereby the heat content of the spray dryer off gases is increased by increasing the temperature of the spray dryer off gases used to substitute for part of the cold air intake to the spray dryer heater and to supply heat to the aqueous slurry concentrator means.

It is a still further object of this invention, which is directed towards improved processing means for removing water from kaolin slurries, to simultaneously produce concentrated slurry products and spray dried kaolin particulates whereby an evaporative slurry concentrator system is coupled with a spray dryer such that off gases from the spray dryer are used to supply thermal energy to a spray dryer and to the slurry concentrator system.

One specific object of the present invention is to provide means to control the oxygen content of gases delivered to the spray dryer which necessarily contact the material being spray dried.

It is a still further object of this invention to provide means for removing water from kaolin slurries with a reduced heat consumption whereby an aqueous slurry concentration system is coupled with a spray dryer such that off gases from the spray dryer are used to supply thermal energy to the spray dryer and to the aqueous slurry concentration system. The amount of off gases used to supply heat to the spray dryer being such that only sufficient cold fresh air need be introduced to the combustion system as is necessary to assure efficient fuel combustion.

In accordance with the present invention, a beneficiated dilute aqueous clay slurry is concentrated to a solids content of about 50% by first heating the dilute aqueous slurry by non-contact heat exchange with thermal energy recovered from spray dryer exhaust gases and subjecting the heated dilute aqueous slurry to a non-evaporative solids separation device to withdraw water and provide a more concentrated slurry. The resulting slurry having a solids contact of about 50% is concentrated to a solids content of about 70% by passing the aqueous slurry through one or more non-contact heat exchanger/flash chamber evaporative systems to produce an aqueous concentrate of about 70% solids. The 70% solids concentrate may be taken as product or be converted to a dry product by direct contact with heated gases in a spray dryer. An energy efficient process having equipment cost savings is achieved by recycling part of the spray dryer off gases directly to the spray dryer and part to supply thermal energy to the aqueous slurry concentrating system.

The present invention will be more fully understood following review of the drawings appended hereto and the following detailed description of certain preferred embodiments.

BRIEF DESCRIPTION OF THE DRAWINGS

FIG. 4 is a flow sheet diagrammatic illustration of still another embodiment of the process of the present invention;

DETAILED DESCRIPTION OF CERTAIN PREFERRED EMBODIMENTS OF THE INVENTION

Figure 1:
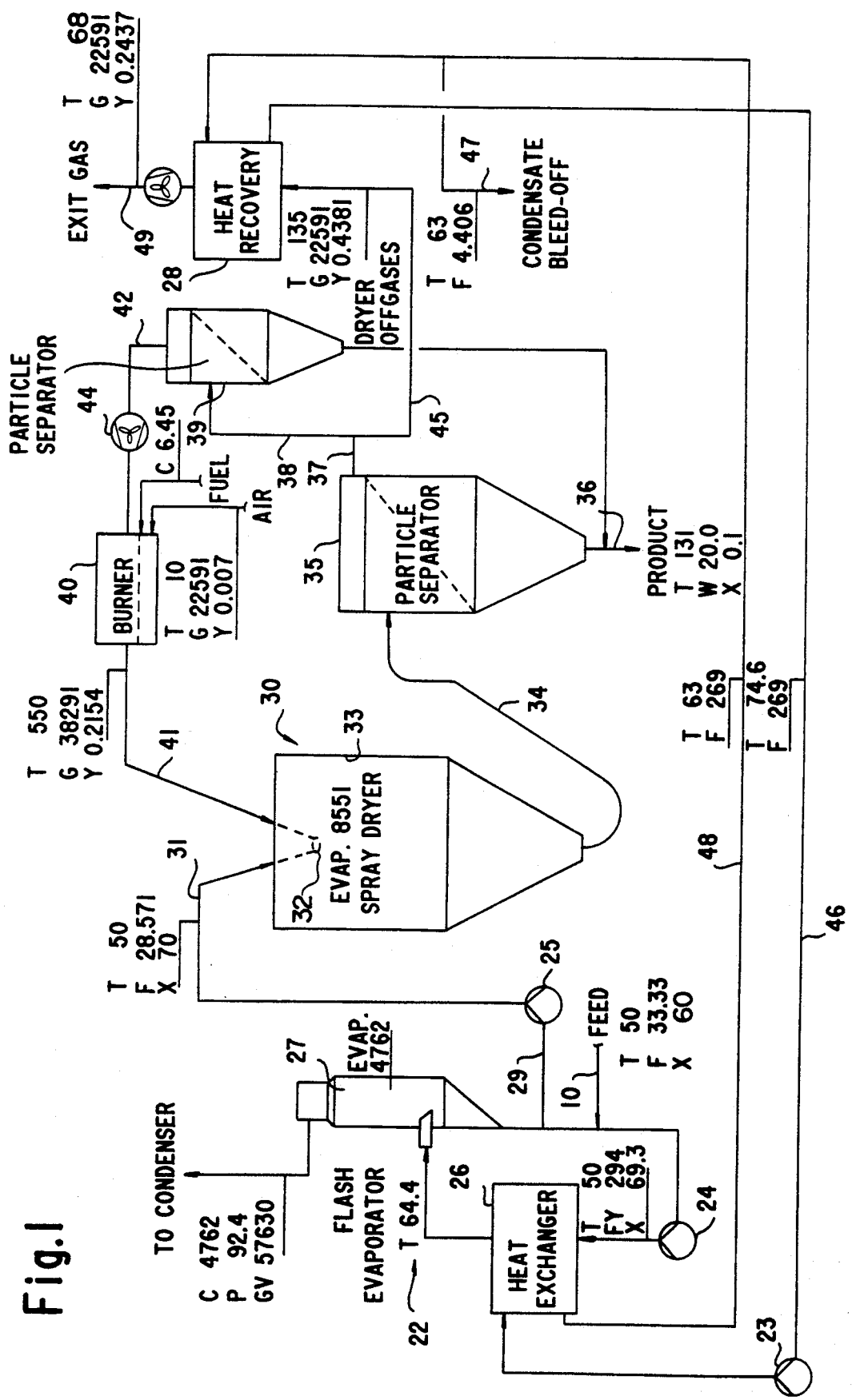
FIG. 1 is a flow sheet diagrammatic illustration of a process of this invention in an embodiment which may be operated to concentrate an aqueous feed slurry and to produce particulate product by spray drying the concentrated aqueous slurry.

The present invention will, by specific example, now be described in detail with reference to the drawings wherein like reference numerals represent like parts throughout.

Apparatus for practicing a preferred embodiment of the process of the present invention is diagrammatically illustrated in FIG. 1. With reference to FIG. 1, there is shown a process and apparatus for producing spray dried kaolin particulates from a 60% solids kaolin feed slurry delivered through a line 10 to a slurry concentrating system generally designated by the reference numeral 22 and including a heat exchanger 26 and a flash evaporator 27. An aqueous feed slurry is delivered from the feed line 10 to the heat exchanger 26 by a pump 24 and then, after exiting the heat exchanger 26 to the flash evaporator 27.

Figure 6:
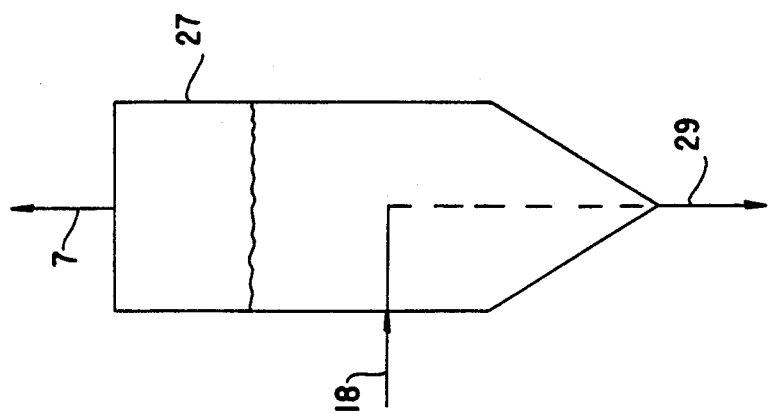
FIG. 6 is a schematic sectional view of a flash chamber which may be utilized in the evaporation system of this invention.
Figure 5:
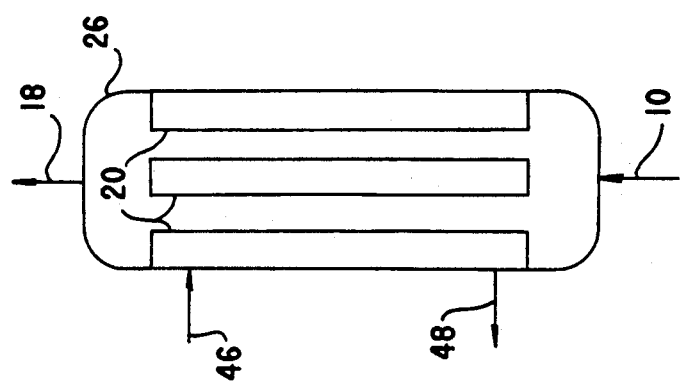
FIG. 5 is a schematic sectional view of a heat exchanger which may be utilized in the feed slurry evaporation system of the present invention.

As more fully shown by FIG. 5 of the drawings, the heat exchanger 26 is comprised of a closed housing with internal chambers providing a heat transfer surface(s) 20 heated by a fluid delivered by line 46 to raise the temperature of the slurry. The internal chambers of the heat exchanger 26 may be formed in conventional manner by an assembly of tubes or spaced plates providing separate flow passages for the slurry and the heated fluid. The pressure internal of the chamber is controlled at a level where the slurry is maintained in a liquid state and boiling is avoided The heated slurry is then moved to the flash evaporator such as that shown by FIG. 6 which includes a chamber maintained at a pressure less than the boiling point pressure of the slurry in order to rapidly evaporate water and separate the water vapor from the heated slurry. Due to the evaporation of water vapor, the slurry drawn from the flash evaporator is a more concentrated slurry, for example, on the order of a 70% solids content slurry.

The concentrated slurry is withdrawn from the slurry concentration system 22 by means of a pump 25 and line 29 which delivers the concentrated slurry to a spray dryer generally designated by the reference numeral 30. The pump 25 delivers the concentrated slurry by means of a line 31 to a rotary atomizing wheel 32 provided adjacent the top of a spray dryer chamber 33. Part of the concentrated slurry exiting the flash evaporator 27 is conveyed to the spray dryer 30 by the pump 25 and part is recirculated with additional feed slurry by means of the pump 24 in the slurry concentration system 22.

Figure 7:
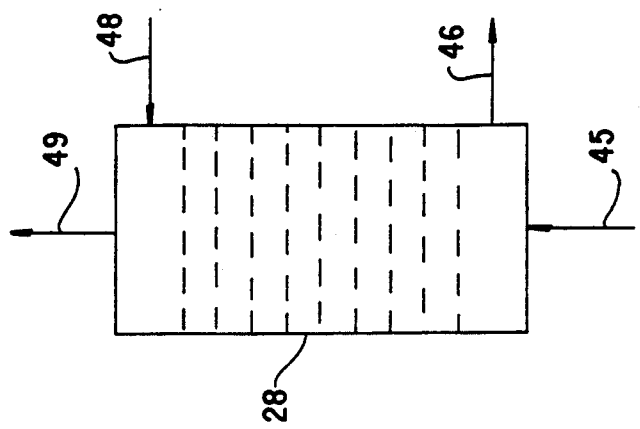
FIG. 7 is a diagrammatic sectional view of a heat recovery unit which may be utilized in the practice of the present invention.

Heated gases are also provided to the spray dryer chamber 33 by means of a supply duct 41 delivering heated gases from a burner 40. Burner 40 is supplied with a combustible mixture of air and fuel to provide the heated gases delivered to the spray dryer. As will be described more fully below, "off-gases" from the spray dryer, i.e. hot gases withdrawn from the spray dryer, are also delivered or recirculated through the supply duct 41. Internally of the spray dryer chamber 33, the concentrated slurry is sprayed by the rotary atomizing wheel 32 into the hot atmosphere or drying medium internally of the chamber 33. Small particles of the concentrated slurry provided by the rotary atomizer wheel are dried by the hot gases to produce a desired particulate material which is removed from the spray dryer in the form of a powder and delivered by a duct 34 to a particle separator 35 wherein a major portion of the particulate product is removed at 36. A gaseous effluent which is still at a relatively high temperature is removed from the particle separator 35 by line 37. A part of the hot gaseous effluent is delivered through a line 38 to a second particle separator 39. Another part of the hot gases withdrawn from the particle separator 35 is delivered along line 45 to a heat recovery unit 28 as diagrammatically illustrated in FIG. 7. The gaseous effluent taken from the particle separator 35 is comprised of hot off-gases withdrawn from the spray dryer 30 and remain at a sufficiently high temperature to warrant utilization of the thermal energy contained therein and thus, the hot gases taken along line 38 are recycled to the spray dryer and the thermal energy of the hot gases taken along line 45 is recovered by heat recovery unit 28 for use in heat exchanger 26.

More specifically additional particulate product which may remain in the hot gases delivered by line 38 are separated by particle separator 39 and returned for removal with the particulate product from particle separator 35 at 36. The hot gases delivered to the particle separator 39 by line 38 are withdrawn through a duct 42 by blower 44 and delivered with hot gases provided by the burner 40 to the supply duct 41 delivering hot gases to the spray dryer 30. The hot off gases withdrawn by line 34 from the spray dryer 30 are thus recycled through the particle separators 35 and 39 and duct 42 to supplement the hot gases provided by the burner 40 and reduce the total requirement of fuel and air to maintain operation of the spray dryer 30 at a desired temperature. Although the duct 42 is schematically shown as delivering off gases to the burner 40, the off gases are separated from the gases of combustion internally of the burner so as not to reduce efficiency of the combustor, but are delivered or added to the hot gases flowing from the burner through the supply duct 41. The duct 42 could be joined with the supply duct 41 downstream from the burner 40. However, it is preferred to deliver the off gases from the line 42 adjacent a combustor in order to take advantage of the use of a single blower such as the blower 44 for moving both the recycled off gases from duct 42 as well as the hot gases provided by the combustor.

The other part or portion of the hot off gases from the spray dryer delivered to the heat recovery unit 28 by line 45 heat a liquid, typically water which is delivered by a pump 23 in line 46 to the heat exchanger 26. The water is returned from heat exchanger 26 by return line 48 to the heat recovery unit 28. The liquid circulated through the heat exchanger 26 and the heat recovery unit 28 is heated mainly by condensing water vapor in the recovery unit 28. The condensate exits the system via a condensate bleed off 47. The hot off gases from the spray dryer are drawn to the heat recovery unit 28 and exhausted by means of an exhaust fan 49.

With reference to the apparatus illustrated in FIG. 1, the process of the present invention is practiced by delivering a feed slurry through the feed line 10 to the slurry concentration system 22 where a portion of the water vapor is evaporated to provide a concentrated slurry which in turn is delivered by pump 25 and line 31 to the spray dryer 30. The concentrated slurry is spray dried internally of the chamber 33 from which the hot gases and dry particulate product are withdrawn and delivered to the particle separators 35 and 39. The particulate product is withdrawn from the particle separators and the hot gases withdrawn from the spray dryer are separated to provide a first portion which is returned along lines 38 and 42 and recycled through the spray dryer 30 and another portion which is delivered along the line 45 to the heat recovery unit 28 and utilized to heat a liquid circulated by the pump 23 to the heat exchanger 26.

Figure 2:
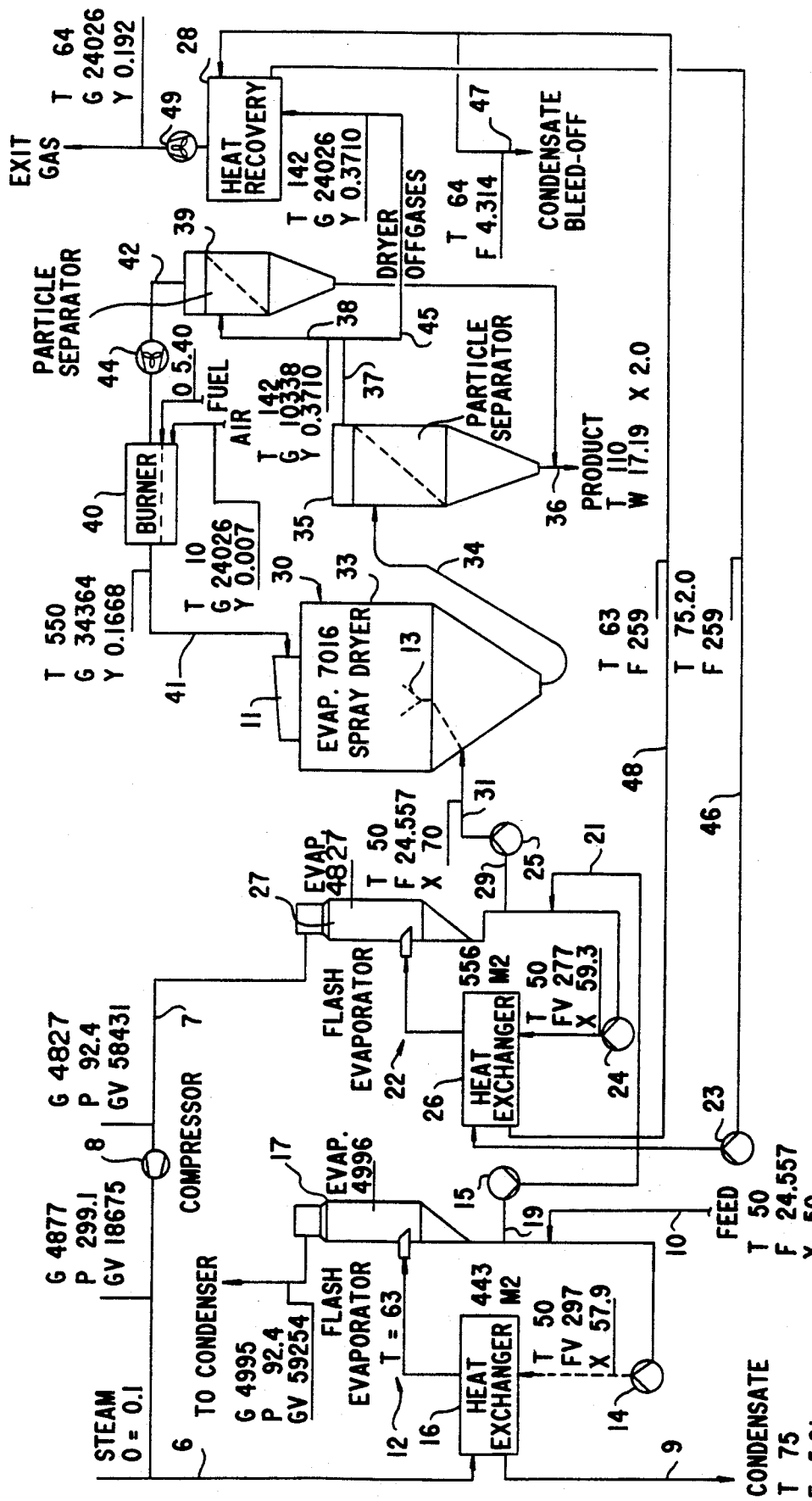
FIG. 2 is a flow sheet diagrammatic illustration similar to FIG. 1 but showing an alternate embodiment of the process of this invention for concentrating an aqueous feed slurry and spray drying the concentrated feed slurry to produce particulate product.

An alternate apparatus for practicing the process of the present invention is diagrammatically illustrated in FIG. 2. A number of the components of the apparatus of FIG. 2 may be the same as components previously discussed in the description of the apparatus of FIG. 1 and the same reference numerals as used in FIG. 1 are used to identify those same or similar components in FIG. 2. The slurry concentrating apparatus of FIG. 2 includes a first stage slurry concentrating system generally designated by the reference numeral 12 which includes a first heat exchanger 16 and flash evaporator 17 and a second stage slurry concentrating system generally designated by the reference numeral 22 which includes a second heat exchanger 26 and second flash evaporator chamber 27. Concentrated slurry withdrawn from the second stage slurry concentrating system 22 by line 29 and pump 25 is delivered by line 31 to a spray nozzle 13 located internally of the spray dryer chamber 33. Hot gases from a burner 40 are delivered by line 41 to a gas distributor housing 11 provided at the top of the spray dryer 30. The spray nozzle 13, like the rotary atomizer wheel 32 of FIG. 1 is an atomizing device which serves to spray small particles of the slurry fed by line 31 internally of the spray dryer chamber 33. However, in FIG. 2, the spray nozzle 13 is directed upwardly toward the gas distribution chamber 11 to provide a continuous fountain type spray of the particles or droplets of the liquid feed material which are dried or reacted to provide a desired particulate material by the hot gases forced downward from the gas distribution chamber 11.

The process of the present invention is practiced with the apparatus illustrated in FIG. 2 by delivering an aqueous feed slurry, for example, a kaolin slurry having 50% solids content, by feed line 10 to the first stage slurry concentrating system 12. The feed slurry is partially mixed with a previously concentrated slurry recirculating in the first stage and delivered to the heat exchanger 16 by pump 14 where the slurry is heated at an increased pressure to maintain the slurry in a liquid state and then moved to the flash evaporator chamber which is maintained at a reduced pressure to rapidly separate water vapor from the heated slurry. The slurry is then withdrawn from the first stage slurry concentration system 12 by means of a pump 15 and line 19 which delivers the slurry along line 21 to the second stage slurry concentrating system 22. In the second stage slurry concentrating system 22, the slurry is mixed with previously treated slurry recirculated in the system 22 by pump 24 and delivered to a heat exchanger 26 having a solids content of approximately 69% due to treatment in the first slurry concentrating system 12 and mixture with the previously treated slurry in the second concentrating system 22. The slurry is heated under increased pressure in the heat exchanger 26 and then moved to the flash evaporator chamber maintained under reduced pressure in the evaporator 27 to rapidly separate water vapor from the heated slurry. Concentrated slurry, now having a solids content of approximately 70% is withdrawn from the second stage slurry concentrating system 22 by means of a pump 25 and line 29 which delivers the concentrated slurry to the spray dryer 30. The pump 25 delivers the concentrated slurry by means of line 31 to the spray nozzle 13 where the slurry is sprayed upwardly as small liquid droplets or particles and dried by hot gases forced downwardly from the gas distribution chamber 11 to dry the particles and provide a kaolin particulate product.

As previously described in the discussion of the apparatus of FIG. 1, the hot gases and particulate product are withdrawn from the spray dryer 30 by line 34 and delivered to particle separators 35 and 39 where a particulate product, in this case kaolin particulates having a water content of approximately 2% are recovered. The hot off gases from the spray dryer 30 are withdrawn along line 37 from the particle separator 35 and a portion of the hot off gases are delivered along line 38 to the particle separator 39 where they are recycled by blower 44 and line 42 with hot gases from the burner 40 to the gas distribution chamber 11 of the spray dryer 30. A portion of the hot gases withdrawn from the particle separator 35 are also delivered along line 45 to the heat recovery unit 28 to heat water circulated by pump 23 and line 46 to the heat exchanger 26 of the second stage slurry concentrating system 22 and then returned along line 48. The apparatus of FIG. 2 thus provides similar energy savings by recovering or reusing thermal energy in the off gases from the spray dryer 30 as are realized with the apparatus of FIG. i and also provides an additional benefit in terms of energy savings.

The additional benefit is realized in the two stage slurry concentrating system. As previously discussed, thermal energy from the hot spray dryer off gases is utilized in the second stage slurry concentrating system 22 to heat slurry in the heat exchanger 26.

The first stage heat exchanger 16 is heated by steam provided along a line 6 with the condensate being withdrawn along line 9. A line 7 and compressor 8 are provided between the second stage flash evaporator 27 and the first stage steam feed line 6 to compress the hot water vapor removed from the flash evaporator 27 and deliver the same as an admixture to the steam delivered along line 6. The two stage slurry concentrating system of FIG. 2 thus takes further advantage of the thermal energy recovered from the hot spray dryer off gases and delivered to the heat exchanger 26 by compressing water vapor withdrawn from the flash evaporator 27 and mixing the same with steam to provide an additional thermal energy input for the first stage heat exchanger 16.

Figure 3:
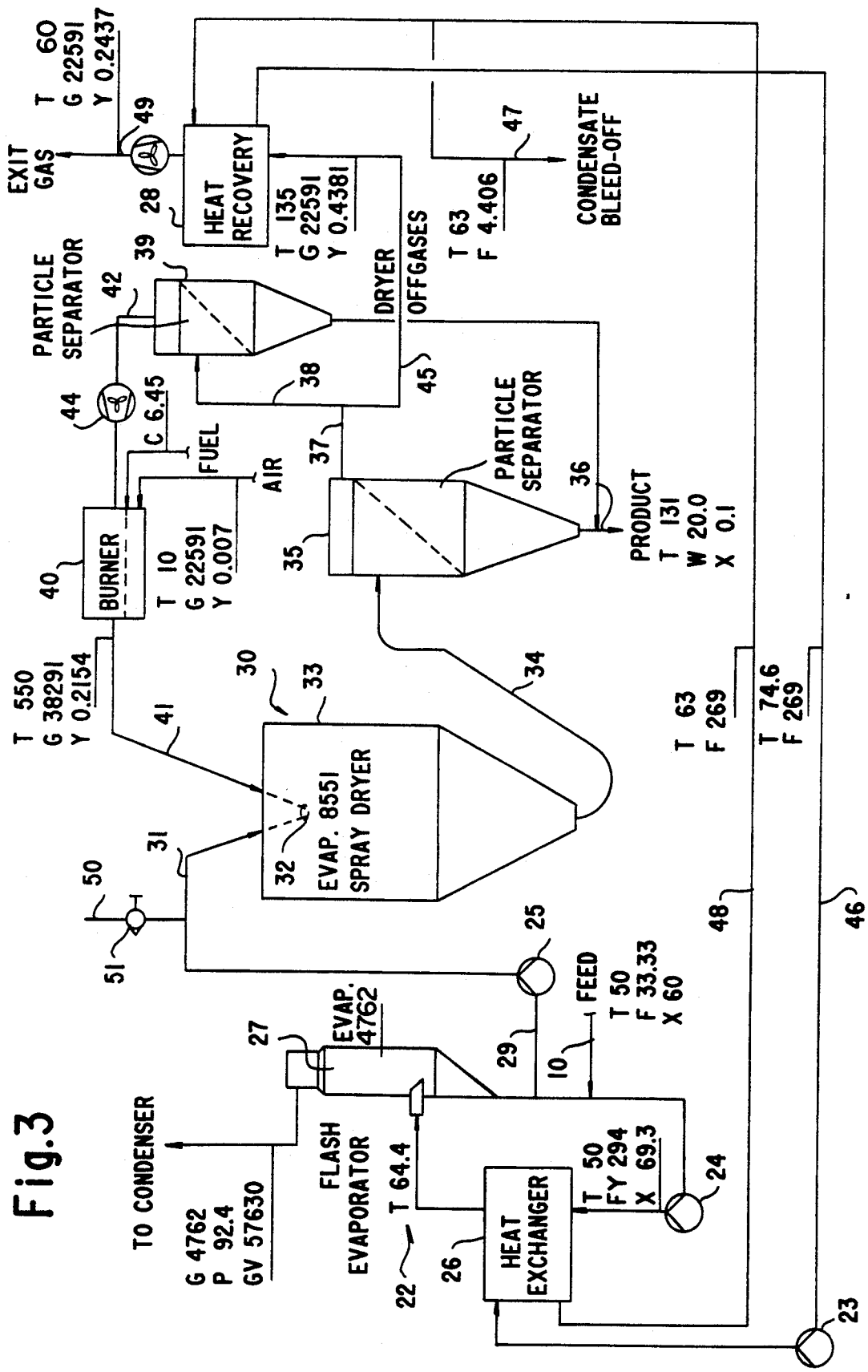
FIG. 3 is a flow sheet diagrammatic illustration of another alternate embodiment of the process of the present invention.

The apparatus illustrated by FIG. 3 is similar to the apparatus of FIG. 1 but includes a concentrated slurry product withdrawal line 50 connected to the spray dryer feed line 31. A valve 51 is provided to the concentrated slurry product withdrawal line 50 to permit the selective withdrawal of a concentrated slurry product from the spray dryer feed line 31 while simultaneously feeding concentrated slurry to the spray dryer 30. If there is no requirement for a concentrated slurry product, the valve 51 may be closed to supply concentrated slurry from the slurry concentration system 22 to the spray dryer 30. The apparatus illustrated in FIG. 3 may be operated, for example, by providing an aqueous feed slurry of approximately 60% solids content to the feed line 10, withdrawing a concentrated 70% solids content slurry from the line 50 while simultaneously providing a 70% solids concentrated slurry product to the rotary atomizer wheel 32 and recovering from the particle separators 35 and 39 a particulate product having approximately 0.1% water content.

The apparatus illustrated in FIG. 4 is also similar to the apparatus illustrated in FIG. 1 with the exception that separate feed slurry lines 10 and 10' are provided for the slurry concentrating system 22 and the spray dryer 30 and the pump 24 delivers concentrated slurry from the system 22 to a concentrated slurry product withdrawal line 52. The apparatus of FIG. 4 may be operated by providing an aqueous feed slurry of approximately 60% solids content to the feed line 10 for circulation in the slurry concentrating system 22, heating the feed slurry in the heat exchanger 26 and evaporating water vapor in the flash evaporator 27 to produce a concentrated slurry product of approximately 70% solids content which may be withdrawn along lines 29 and 52. A similar, or the same, 60% solids content aqueous feed slurry is also delivered by the feed line 10', pump 25' and line 31 to a rotary atomizer wheel 32 provided internally of the spray dryer chamber 33 for processing to recover a particulate product from the particle separators 35 and 39 having approximately 0.1% water content. Although separate products, a concentrated slurry and a particulate product are withdrawn from the apparatus of FIG. 4, the process of the invention is nevertheless operated as an integrated process with respect to the advantages provided by the present invention in that the thermal energy of the hot gases withdrawn from the particle separator 35 is recovered by recycling a portion of the hot gases through the spray dryer 30 and utilizing another portion as a source of heat providing thermal energy to the heat exchanger 26.

EXAMPLES

A number of examples utilizing the apparatus of FIG. 1 to practice the process of the present invention have been conducted. The design and process conditions controlled during operation of the process for each of the examples are summarized in Table 1. These examples are for operations at a constant spray dryer inlet temperature of 550° C.

TABLE 1

| 1 MATERIAL: KAOLIN | | | | | |
|---|---|---|---|---|---|
| 2 DATASET NO. | 1 | 2 | 3 | 4 | 5 |
| 3 AMBIENT TEMP. C. | 10 | 10 | 10 | 10 | 10 |
| 4 COLD AIR MOISTURE, KG/KG | 0.0070 | 0.0070 | 0.0070 | 0.0070 | 0.0070 |
| 5 FEED RATE, DRY SOLIDS, KG/H | 20000 | 20000 | 20000 | 20000 | 20000 |
| 6 SPECIFEC HEAT, KCAL/KG/C. | 0.22 | 0.22 | 0.22 | 0.22 | 0.22 |
| 7 FEED TEMPERATURE, C. | 50 | 50 | 50 | 50 | 50 |
| 8 FEED SOLIDS, % | 60 | 70 | 70 | 70 | 70 |
| 9 | | | | | |
| 10 WET FEED RATE, KG/H | 33333 | 28571 | 28571 | 28571 | 28571 |
| 11 EVAPORATION, KG/H | 13313 | 8551 | 8551 | 8551 | 8551 |
| 12 | | | | | |
| 13 BURNER OUTLET GAS: | | | | | |
| 14 BURNER TEMPERATURE, C. | 550 | 550 | 800 | 1000 | 1915 |
| 15 DRY AIR RATE, KG/H | 73171 | 48052 | 30011 | 22591 | 9198 |
| 16 MOISTURE CONTENT, KG/KG | 0.0328 | 0.0328 | 0.0474 | 0.0602 | 0.1400 |
| 17 DEWPOINT, C. | 33.2 | 33.2 | 39.9 | 43.7 | 58.6 |
| 18 | | | | | |
| 19 RECYCLE GAS: | | | | | |
| 20 TEMPERATURE, C. | 120 | 120 | 130 | 135 | 150 |
| 21 RECYCLE GAS RATE, DRY, KG/H | 0 | 0 | 12450 | 15699 | 15000 |
| 22 MOISTURE CONTENT, KG/KG | 0.2147 | 0.2107 | 0.3323 | 0.4387 | 1.0696 |
| 23 DEWPOINT, C. | 65.9 | 65.6 | 72.9 | 77.0 | 87.6 |
| 24 AMOUNT OF RECYCLE, % | 0.0 | 0.0 | 29.3 | 41.0 | 62.0 |
| 25 | | | | | |
| 26 SPRAY DRYER, INLET GAS: | | | | | |
| 27 SPRAY DRYER INLET TEMP. C. | 550 | 550 | 550 | 550 | 550 |
| 28 DRY GAS RATE, KG/H | 73171 | 48052 | 42462 | 38291 | 24199 |
| 29 MOISTURE CONTENT, KG/KG | 0.0328 | 0.0328 | 0.1309 | 0.2154 | 0.7162 |

TABLE 1-continued

| | | | | | |
|---|---|---|---|---|---|
| 30 DEWPOINT, C. | 33.2 | 33.2 | 57.4 | 65.9 | 83.4 |
| 31 | | | | | |
| 32 SPRAY DRYER, EXIT GAS: | | | | | |
| 33 TEMPERATURE, C. | 120 | 120 | 130 | 135 | 150 |
| 34 DRY GAS RATE, KG/H | 73171 | 48052 | 42462 | 38291 | 24199 |
| 35 MOISTURE CONTENT, KG/KG | 0.2147 | 0.2107 | 0.3323 | 0.4387 | 1.0696 |
| 36 DEWPOINT, C. | 65.9 | 65.6 | 72.9 | 77.0 | 87.6 |
| 37 | | | | | |
| 38 | | | | | |
| 39 EXIT GAS TO HEAT RECOVERY: | | | | | |
| 40 TEMPERATURE C. | 120 | 120 | 130 | 135 | 150 |
| 41 DRY GAS RATE, KG/H | 73171 | 48052 | 30011 | 22591 | 9198 |
| 42 MOISTURE CONTENT, KG/KG | 0.2147 | 0.2107 | 0.3323 | 0.4387 | 1.0696 |
| 43 DEWPOINT, C. | 65.9 | 65.6 | 72.9 | 77.0 | 87.6 |
| 44 | | | | | |
| 45 HEAT CONSUMP, KCAL/KG WATER | 785 | 803 | 769 | 754 | 731 |
| 46 HEAT CONSUMPTION, MIL.KCAL/H | 10.45 | 6.87 | 6.58 | 6.45 | 6.25 |
| 47 | | | | | |
| 48 RECOVERY: | | | | | |
| 49 RECOVERY TEMP. C. | 61.82 | 57.40 | 64.00 | 68.03 | 80.30 |
| 50 MOISTURE, KG/KG | 0.1685 | 0.1307 | 0.1914 | 0.2437 | 0.5560 |
| 51 CONDENSATE, KG/H | 3379 | 3844 | 4228 | 4406 | 4724 |
| 52 HEAT RECOVERED MIL.KCAL/H | 3.1296 | 3.1278 | 3.1276 | 3.1289 | 3.1256 |
| 53 RECOVERY, % | 29.9 | 45.6 | 47.6 | 48.5 | 50.0 |
| 54 | | | | | |
| 55 DRYER SIZE: | | | | | |
| 56 DIAMETER, M | 10.0 | 8.4 | 8.4 | 8.4 | 8.4 |
| 57 CYLINDER, M | 5.4 | 5.4 | 5.4 | 5.4 | 5.4 |
| 58 VOLUME, M3 | 650 | 433 | 433 | 433 | 433 |

With reference to Table 1, line 2 identifies data sets 1–5 which are equivalent to five different examples of operating the apparatus of FIG. 1 to produce a concentrated kaolin slurry and a kaolin particulate product. With particular reference to lines 24 and 8 of Table 1, the examples 1–5 using different ratios of recycling off gas from the spray dryer from 0% recycle in Examples 1 and 2 up to 62% recycle in Example 5. With reference to line 8, Example 1 was run using a 60% solids feed without subjecting the feed slurry to a slurry concentration step. In Examples 2–5, a 60% contents feed slurry was first subjected to a concentration step enhancing the solids content to 70%.

Additional data relative to the examples or data set numbers 1–5 of Table 1 is set forth in Table 2.

TABLE 2

| | | | | | |
|---|---|---|---|---|---|
| 1 DATASET NO. | 1 | 2 | 3 | 4 | 5 |
| 2 EVAPORATOR: | NONE | YES | YES | YES | YES |
| 3 FEED SOLIDS, INLET % | N/A | 60 | 60 | 60 | 60 |
| 4 FEED TEMP. C. | N/A | 50 | 50 | 50 | 50 |
| 5 FEED RATE, KGS/H | N/A | 33333 | 33333 | 33333 | 33333 |
| 6 DENSITY G/ML, 23 C. | N/A | 1.5600 | 1.5600 | 1.5600 | 1.5600 |
| 7 SPECIFIC HEAT, KCL./KG/C. | N/A | 0.5320 | 0.5320 | 0.5320 | 0.5320 |
| 8 FEED SOLIDS, OUT % | N/A | 70 | 70 | 70 | 70 |
| 9 OUTLET RATE, KG/H | N/A | 28571 | 28571 | 28571 | 28571 |
| 10 OUTLET TEMP. C. | N/A | 50.0 | 50.0 | 50.0 | 50.0 |
| 11 DENSITY G/ML, 23 C. | N/A | 1.7500 | 1.7500 | 1.7500 | 1.7500 |
| 12 SPECIFIC HEAT, KCL,KG/C. | N/A | 0.4540 | 0.4540 | 0.4540 | 0.4540 |
| 13 EVAPORATION, KG/H | N/A | 4762 | 4762 | 4762 | 4762 |
| 14 HEAT EXHANGER: | N/A | | | | |
| 15 HEATING WATER TEMP., INLET C. | N/A | 63.6 | 70.5 | 74.6 | 86.4 |
| 16 HEATING WATER TEMP., OUT C. | N/A | 54.0 | 60.0 | 63.0 | 70.0 |
| 17 KAOLIN SLURRY TEMP., INLET C. | N/A | 50.0 | 50.0 | 50.0 | 50.0 |
| 18 KAOLIN SLURRY TEMP., OUT C. | N/A | 62.0 | 63.4 | 64.4 | 71.0 |
| 19 HEAT REQUIRED KCAL/H/C. | N/A | 2.8429 | 2.8429 | 2.8429 | 2.8429 |
| 20 INCL. 10% LOSS KCAL/H/C. | N/A | 3.1271 | 3.1271 | 3.1271 | 3.1271 |
| 21 SLURRY CIRCULATION TON/H | N/A | 574.0 | 514.0 | 478.3 | 328.0 |
| 22 VOLUMETRIC RATE, M3/H | N/A | 328.0 | 293.7 | 273.3 | 187.4 |
| 23 SOLIDS CONC. IN HEATER % | N/A | 69.42 | 69.35 | 69.30 | 68.98 |
| 24 HOT WATER RATE TON/H | N/A | 325.7 | 297.8 | 269.6 | 190.7 |
| 25 HEAT TRANSFKOEF KCAL/H/M2/C. | N/A | 400 | 400 | 400 | 400 |
| 26 DRIVING TEMP. C. | N/A | 2.8 | 8.6 | 11.6 | 17.7 |
| 27 AREA, M2 | N/A | 2792.1 | 914.4 | 674.0 | 441.7 |
| 28 FLASH/SEPARATOR: | | | | | |
| 29 FLASH DOWN, C. | N/A | 12.0 | 13.4 | 14.4 | 21.0 |
| 30 TEMP. C. | N/A | 50.0 | 50.0 | 50.0 | 50.0 |
| 31 VAPOR PRESSURE MM HG | N/A | 92.4 | 92.4 | 92.4 | 92.4 |
| 32 VOL. FLOW, N3/H | N/A | 720.8 | 720.8 | 720.8 | 720.8 |
| 33 | | | | | |
| 34 SCRUBBER/CONDENSER DIAM, M | | 3.18 | 2.80 | 2.50 | 2.00 |
| 35 | | | | | |
| 36 TOTAL PROCESS: | | | | | |
| 37 EVAPORATION | | | | | |
| 38 DRYER-EVAPORATOR, KG/H | 13313 | 13313 | 13313 | 13313 | 13313 |
| 39 HEAT CONSUMP. KCAL/KG WATER | 785 | 516 | 494 | 484 | 470 |

TABLE 2-continued

| | | | | | |
|---|---|---|---|---|---|
| 40 HEAT SAVINGS % | 0.0 | 34.3 | 37.1 | 38.3 | 40.2 |

Figure 11:
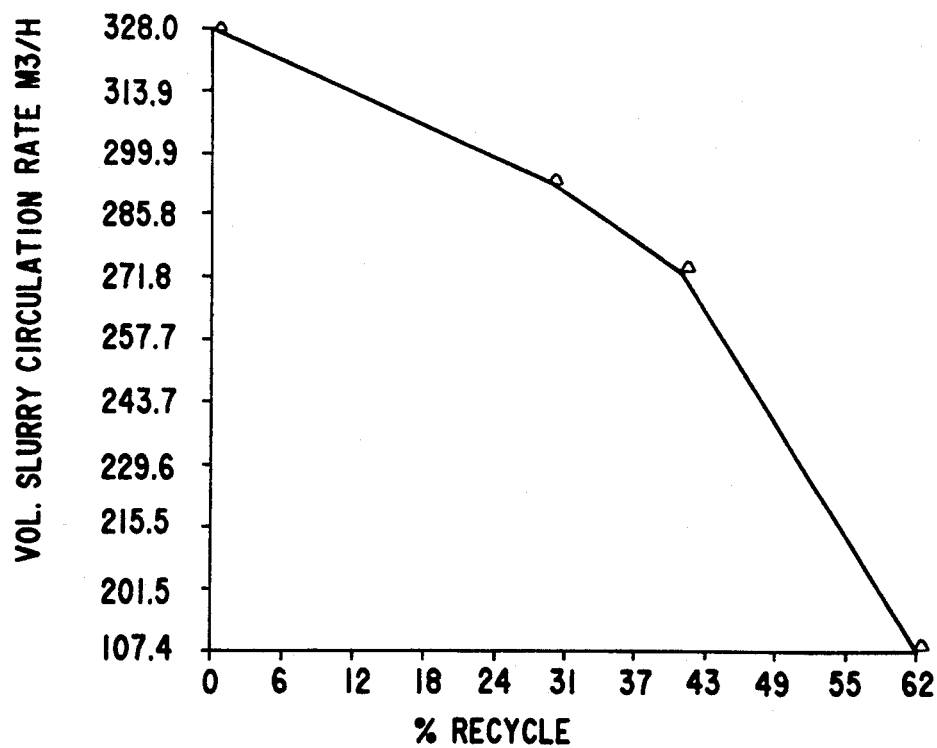
FIG. 11 is a graph showing the declining relationship between the volume of the aqueous slurry circulation rate passing through the heat exchanger as a function of the percent of exhaust gas recycled from the spray dryer.

With reference to Table 2, data set numbers 3-5 are directly related to the data set numbers or Examples 3-5 of Table 1 where the apparatus was operated at 29.3, 41.0 and 62% recycle of spray dryer gases using a feed slurry having 70% solids content in the feed to the spray dryer. Data set number 1, as previously mentioned, used a feed slurry having 60% solids content in the feed to the spray dryer. The example represented by data set 5 which was operated with 62% recycling of the spray dryer off gases represents the stoichiometric amount of recycle such that the only cold or fresh air introduced to the system is that quantity of air supplied to the burner 40 to assure and maintain efficient fuel combustion. Operation at 62% recycle results in a near zero oxygen content of the spray dryer off gases and a minimum heat exchanger area requirement as shown by FIG. 11. Note that a near linear reduction in heat exchanger area requirement is obtained between 5% and 30% recycle.

In all operations of this invention, there must be a recycle of at least a part of the spray dryer off gases to the spray dryer inlet, and, further, there must be at least sufficient ambient cold air intake to the spray dryer heat source to provide sufficient oxygen for efficient fuel combustion in the burner. In the examples of this specification, as established for a kaolin processing operation, a spray dryer inlet temperature of 550° C. was used. At this gas inlet temperature, a maximum of 62% of the spray dryer off gases can be recycled to the spray dryer as shown by dataset number five, Table 1. Operation at 62% recycle results in essentially an oxygen free drying operation. As shown in Tables 1 and 2, the process of this invention may be operated using a spray dryer inlet temperature of 550° C., while providing more ambient cold air intake than is sufficient to provide oxygen sufficient for efficient combustion of the required fuel.

Alternately, as may be dictated by specific properties of a material being processed, the process of this invention may be operated at spray dryer inlet temperatures greater than or less than 550° C. as shown in Table 1. If the inlet temperature is lowered, relatively more spray dryer off gases may be recycled. If the inlet temperature is raised, relatively less spray dryer off gases can be recycled while obtaining the objectives of this invention.

Figure 8:
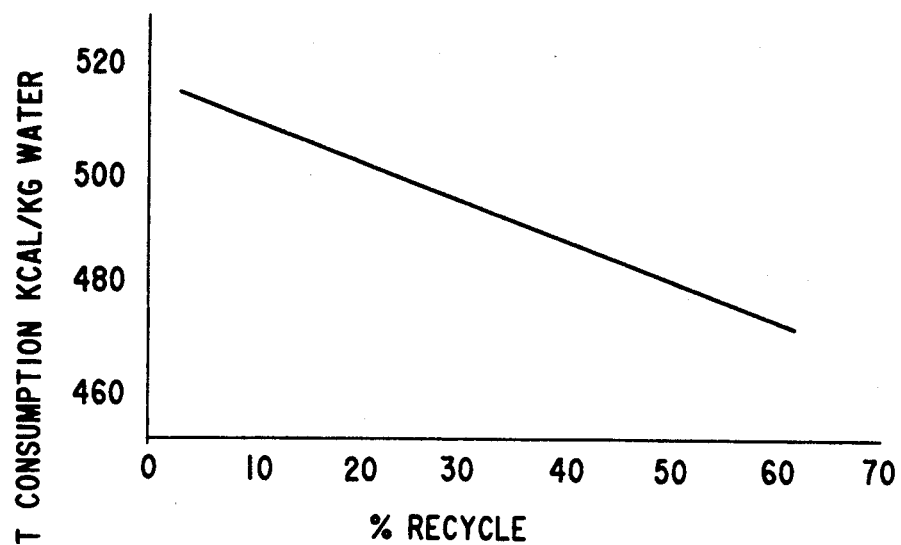
FIG. 8 is a graph showing the heat consumption requirements as a function of the amount of spray dryer exhaust gases recycled to the spray dryer in the practice of the present invention.

The energy saving advantages offered by the process of the present invention are clearly indicated in Tables 1 and 2 where a 40.2% heat savings is attained in Example 5 over the comparative base case of Example 1 when the process is operated to recycle about 62% of the spray dryer off gases to the spray dryer. The energy savings attainable are dramatically illustrated in FIG. 8 wherein the heat consumption measured in terms of KCAL/KG water evaporated as listed in Table 2 at line 39 is plotted against the corresponding amount of recycle for each of the examples as listed in Table 1 at line 24. By definition herein, the percentage of spray dryer off gas recycled to the spray dryer is expressed a the KG/H dry gas recycle divided by the KG/H total dry gas rate times 100.

Figure 9:
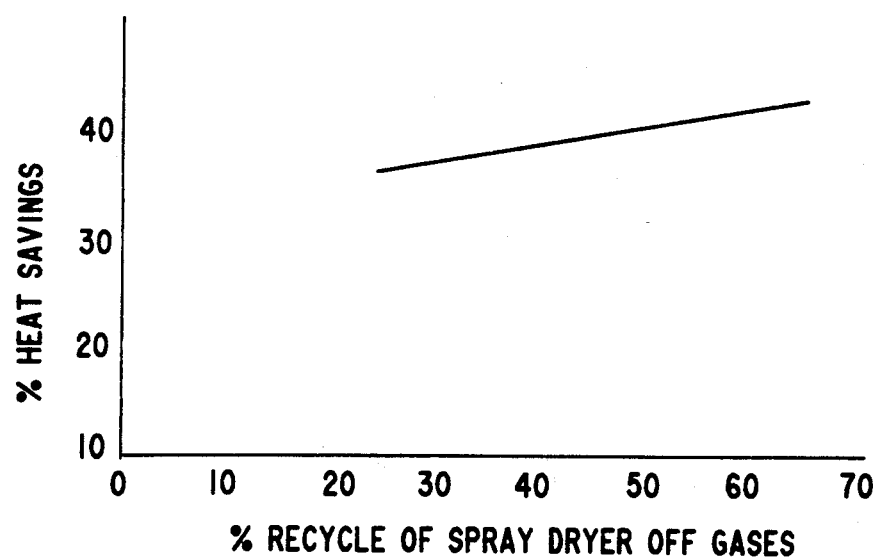
FIG. 9 is a graph showing the heat savings obtainable in a process according to the present invention over a process for producing an equivalent particulate product in a production facility having no feed slurry evaporation capability and without recycling spray dryer off gases to the spray dryer.
Figure 10:
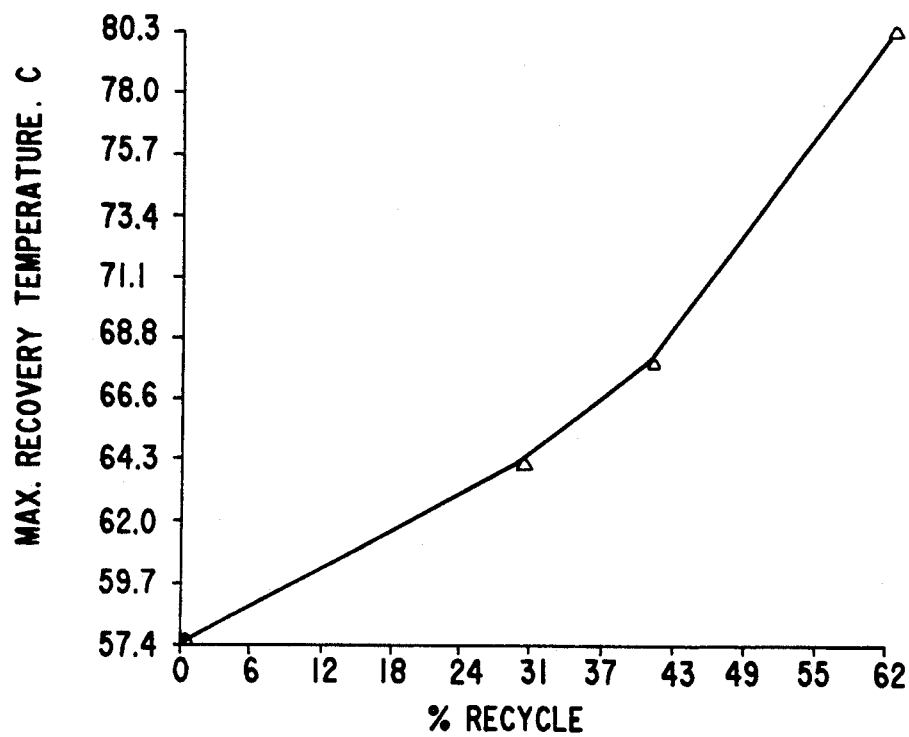
FIG. 10 is a graph showing how, in a specific application of this invention, the maximum temperature of the liquid obtained from the heat recovery unit increases as the quantity of recycled spray dryer off gases increases from 0 to 62%.

FIG. 9 is a graph plotting the heat savings realized in each of the Examples 2-5 as listed in Table 2, line 40 relative to the amount of spray dryer off gases recycled to the spray dryer. FIG. 10 is a graph plotting the recovery temperatures for Examples 1-5 as listed in Table 1, at line 49 against the amount of spray dryer off gases that are recycled to the spray dryer and clearly illustrates how the maximum recovery temperature increases from 57.4° C. at 0% recycle to 80.3° C. at 62% recycle.

FIG. 11 is a graph illustrating how the volume slurry circulation rate in $M^3/H$ (Table 2, line 21) is substantially reduced with an increase in the amount and temperature of spray dryer off gases recycled to the spray dryer.

Figure 12:
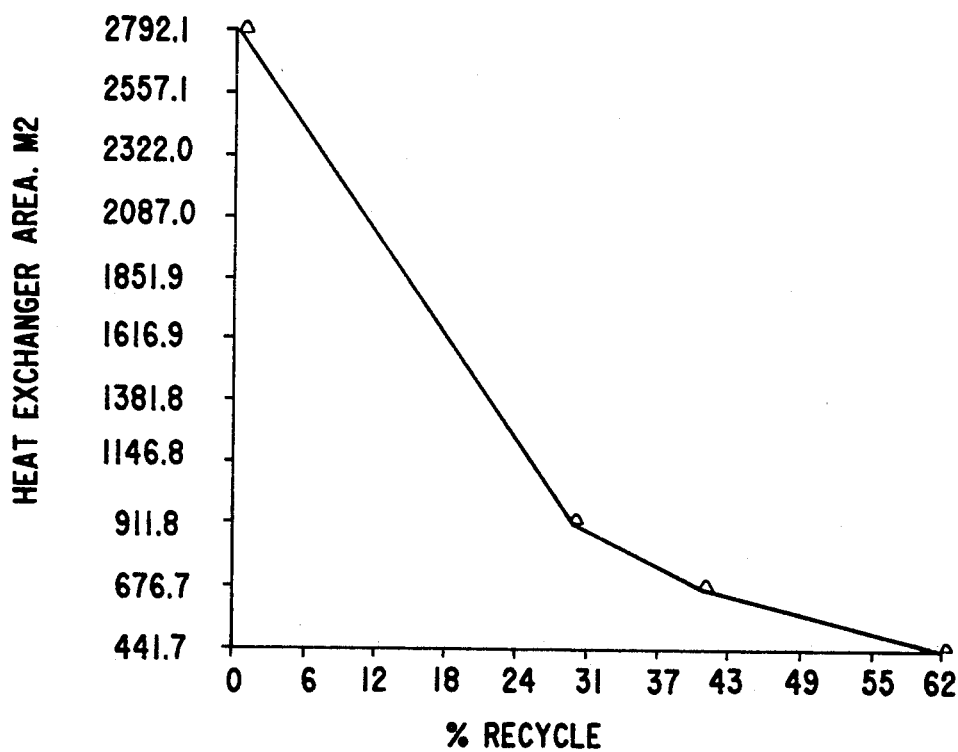
FIG. 12 is a graph showing the declining relationship between the area of a non-evaporative heat exchanger required to produce a slurry having 70% solids content as a function of the percent of exhaust gases recycled from the spray dryer.

FIG. 12 is a graph dramatically illustrating how the surface area of a heat transfer surface such as that which would be utilized in the heat exchanger 26 may be reduced with an increase in the amount of spray dryer off gases recycled to a spray dryer while providing the same heat recovery requirement. This is particularly significant from a capital expenditure point of view since the heat exchangers used in processes to which the present invention is directed typically involve relatively expensive tubular or plate type heat transfer arrays and the expenditure for such apparatus may be reduced by reducing the size of the total surface area required to effect efficient heat recovery. Such a reduction in the total surface area required to effect the efficient heat exchange may be attained by recycling spray dryer off gases to the spray dryer in accordance with the process of the present invention as clearly illustrated by FIG. 12.

Figure 13:
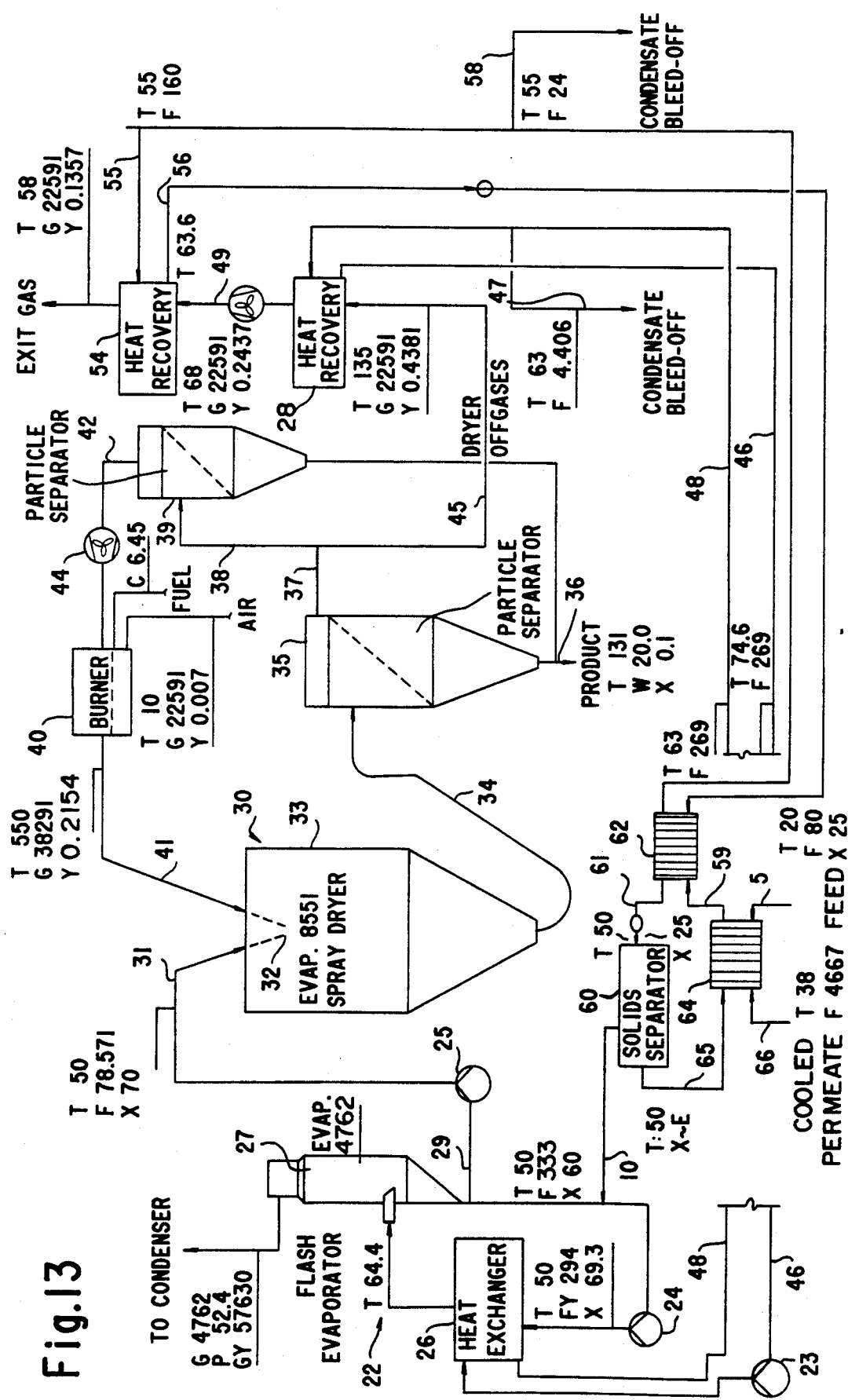
FIG. 13 is a flow sheet diagrammatic illustration similar to FIG. 1 but showing an embodiment of the present invention wherein thermal energy recovered from spray dryer exhaust gases is utilized to raise the temperature of a dilute feed slurry and thereby enhance concentration of the feed slurry in a solids separator.

A still further energy and capital expenditure savings may be realized by the apparatus and process of the present invention as shown by FIG. 13 of the drawings. In addition to the components and process steps as shown by FIG. 1, FIG. 13 also includes a heat recovery unit 54 provided to receive effluent gases from the heat recovery unit 28 of FIG. 1 and means such as the lines 55 and 56 to transfer thermal energy from the heat recovery unit 54 to a dilute feed slurry introduced through supply line 5.

More specifically, effluent gases exit the heat recovery unit 28 by means of blower 16 to a second heat recovery unit 54 at a temperature of 68° C. and then exit heat recovery unit 54 to atmosphere at a temperature of 58° C. A heat transfer fluid such as water enters heat recovery unit 54 via line 55 at a temperature of 55° C. and exits at a temperature of 63.6° C. passing through a line 56 to heat exchanger 62 and returning to the heat recovery unit 54 by the line 55. Condensate exits the system by line 58 at a temperature of 55° C.

The system is provided with a dilute feed slurry which is introduced by feed supply line 5 to heat exchanger 64 at a temperature of 20° C. and a solids concentration of 25%. The dilute feed slurry exits the heat exchanger 64 at a temperature of 28.5° C. and is transferred by line 59 to heat exchanger 62. The dilute feed slurry leaves heat exchanger 62 and is transferred by line 61 to enter a liquid/solids separation device 60 at a temperature of 50° C. and having a solids concentration of 25%. In the liquid/solids separation device 60, the concentration of solids in the slurry is increased from 25% to 60% by separating the liquid content primarily water from the dilute feed slurry in the liquid/solids separation device 60. The concentrated feed slurry leaves the liquid/solids separating device 60 at a temperature of 50° C. and is transferred by the line 10 to enter the non-evaporative heat exchanger 26. The slurry is then heated and further concentrated by the flash evaporator 27, processed through the spray dryer 30 and the resultant particulate product is processed through the particle separators 35 and 39 as previously described in the description of the operation of the process and apparatus as illustrated in FIG. 1.

In the modified process of FIG. 13, permeate exits the liquid/solids separating device 60 via line 65 at a temperature of 50° C., enters the heat exchanger 64 and then exits the heat exchanger 64 at a temperature of 38° C. by line 66 to waste.

The liquid/solids separating device 60 is preferably a membrane type GR40 liquid/solids separator manufactured by Niro Filtration of Hudson, Wisconsin, U.S. The liquid/solids separating device 60 may also comprise a drum filter or centrifuge as conventionally used in the water purification industry.

As previously discussed with respect to the embodiments shown by FIGS. 1–4 of the drawings, the economic value of this invention can be measured directly in terms of the thermal energy recovered and usefully employed in the process of producing concentrated slurry and particulate product. The data set forth in Table 3 is an extension of Data Set No. 4 of Tables 1 and 2 which illustrates one example of operating the apparatus of FIG. 1 to produce a concentrated kaolin slurry and a kaolin particulate product. Table 3 sets forth additional information relating to the operation of a membrane filtration unit, and a first and second heat exchanger such as, for example, the liquid/solids separator device 60 and the heat exchangers 62 and 64 to concentrate a dilute feed supply slurry before delivering the same to a process and apparatus as further shown by FIG. 13 of the drawings.

TABLE 3

| | |
|---|---|
| 1 MEMBRANE FILTRATION UNIT | |
| 2 FEED TEMPERATURE, C. | 20 |
| 3 FEED SOLIDS, % | 25 |
| 4 WET FEED RATE, KG/H | 80000 |
| 5 CONC. TEMPERATURE C. | 50 |
| 6 CONC. SOLIDS C. | 60 |
| 7 CONC. RATE KG/H | 33333 |
| 8 PERMEATE TEMPERATURE C. | 50 |
| 9 PERMEATE RATE KG/H | 46667 |
| 10 HEATING OF CONC. KCAL/H | 532000 |
| 11 HEATING OF PERMEATE KCAL/H | 1400000 |
| 12 HEATING TOTAL KCAL/H | 1932000 |
| 13 HEAT EXCHANGER 1: | |
| 14 PERMEATE INLET C. | 50 |
| 15 PERMEATE OUT C. | 38 |
| 16 DIL. FEED INLET C. | 20 |
| 17 DIL. FEED OUT C. | 28.7 |
| 18 LOG MEAN TEMP. C. | 19.61 |
| 19 AREA M2 | 28.56 |
| 20 HEAT RECOVERED KCAL/H | 560000 |
| 21 HEAT EXCHANGER 2: | |
| 22 HOT WATER INLET C. | 63.6 |
| 23 COLD WATER OUT C. | 55 |
| 24 HOT WATER RATE KG/H | 161500 |
| 25 DIL. FEED INLET C. | 28.7 |
| 26 DIL. FEED OUT C. | 50.3 |
| 27 LOG MEAN TEMP. C. | 19.09 |
| 28 AREA M2 | 72.75 |
| 29 HEAT RECOVERED KCAL/H | 1388900 |
| 30 TOTAL HEAT RECOV. KCAL/H | 1948900 |
| EXTENSION OF DATA FROM COLUMN 4 | |

With reference to Table 3, line 30 clearly indicates that 1,948,900 KCAL/H are recovered from effluent gases which would otherwise merely exit the system and are utilized to raise the temperature of the dilute feed slurry delivered at a temperature of 20° C. to a temperature of 50° C. at the time it is delivered to the liquid/solids separating device 60. This is an important feature of applicant's invention as will be described more fully below.

Figure 14:
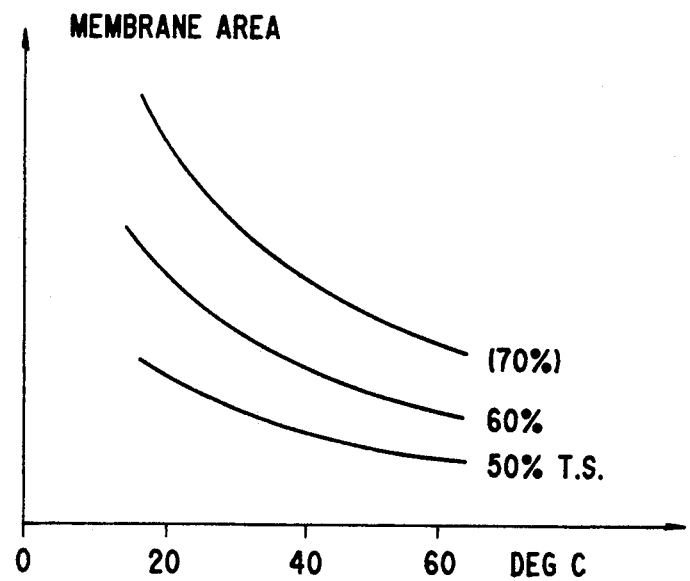
FIG. 14 is a graph illustrating the declining relationship of the area required for a permeable membrane in a permeable membrane type of non-evaporative solids/liquid separation device to enhance slurry concentration as a function of increasing the temperature of the slurry.

The efficiency and productivity of all non-evaporative liquid/solids separation processes including those using vacuum filtration, centrifugation, and membrane filtration are critically dependent on the temperature of the material being processed. FIG. 14 illustrates how the membrane area requirement of a permeable membrane filtration unit may be substantially reduced and still increase the solids content of a slurry product to a particular level by increasing the temperature of the slurry introduced to the filtration unit.

Figure 15:
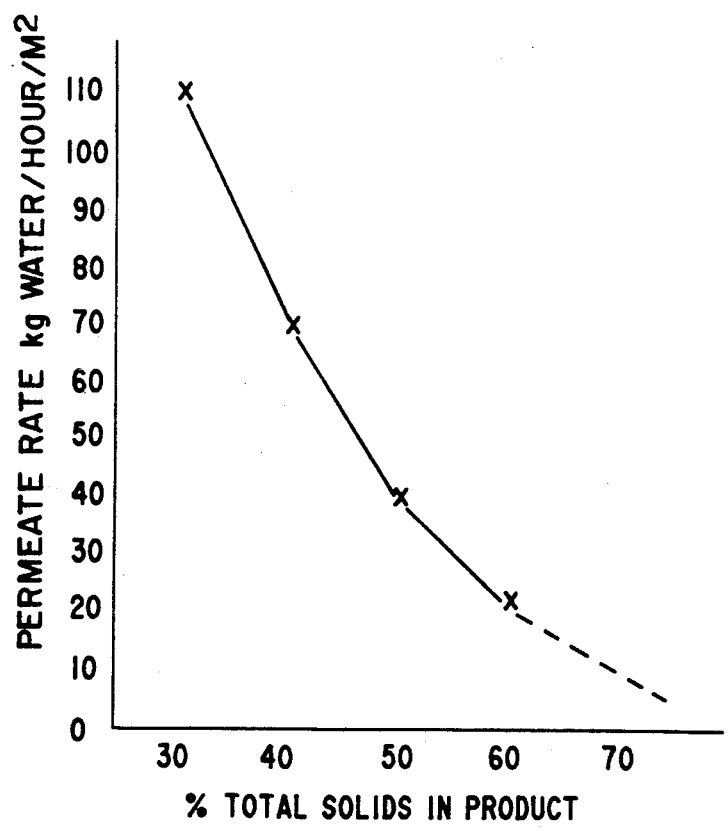
FIG. 15 is graph illustrating the relationship between a slurry product solids content and the rate of liquid separation using a non-evaporative solids/liquid separation device with a permeable membrane.

FIG. 15 illustrates how the production capacity in terms of permeation rate per hour of a permeable membrane filtration device decreases in accordance with an increase in the solids content of a slurry product. The specific permeate rate in permeable membrane separation processes and apparatus as well as other non-evaporative separation processes is temperature dependent. The rate of liquid/solids separation is inversely proportional to the fluid viscosity. At a test temperature of 60° C., the change in viscosity is approximately 1.6% per degree centigrade. It is therefore desirable to increase the temperature of a slurry in order to enhance the rate of liquid/solids separation at least within process and economic parameters. The present invention as illustrated by FIG. 13 enables one to increase the temperature of a dilute feed slurry from 20° C. to 50° C. utilizing thermal energy derived from the spray dryer exhaust gases by means of heat recovery unit 54, and heat transfer units 62 and 64 to increase the temperature of a dilute feed slurry from 20° C. to 50° C. as it is delivered to a liquid/solids separator 60 wherein the 25% concentration of solids in the dilute feed supply is increased to a solids content of about 50% without additional fuel cost or capital expenditure for other equipment to increase the temperature of the dilute feed slurry.

In addition to the energy and capital expenditure savings, the apparatus and process of the present invention also provides an additional benefit in terms of particulate product quality. In processing kaolin, organic additives are provided to raw kaolin slurries for the purpose of improving the material for subsequent processing. However, the organic additive materials tend to discolor and produce off-color particulates when heated in an oxygen containing atmosphere. That is, the quantity of oxygen introduced to a spray dryer chamber for purposes of drying atomized slurry particles may adversely effect the color quality of the particulates recovered from the spray dryer. The process and apparatus of applicants' invention avoids this quality problem since the amount of air introduced to the burner 40 may be controlled and limited to only that quantity of oxygen containing air that is essential for efficient combustion of the fuel delivered to the burner.

The requirement for a specific temperature of the hot gases supplied to the spray dryer—said temperature in general being lower than the temperature of the combustion gases arising from the combustion of the fuel with only the amount of air required for efficient combustion—is met by mixing a part of the spray dryer offgases into the combustion gases. The mass flow of dry gases thus introduced into the system then must also leave the system at the only exhaust point, i.e. the exhaust from the heat recovery unit 28 or 54. Due to the mixing of combustion gases and recycled gases, the exhaust flow contains part of the gases initially present in the system and thus the gas composition in the system gradually is shifted from that of the initial gas to that of the combustion gases being introduced through the burner 40. Thus, the operation of the burner results in combustion gases essentially free of oxygen.

Although specific embodiments of the invention and several alternative processes and apparatus have been disclosed, the present invention is not to be construed a limited to the particular embodiments and forms disclosed herein since the foregoing description is to be regarded as illustrative rather than restrictive and it should be understood that modifications and variations in details of the above described embodiments of the invention may be made without departing from the spirit and scope of the invention as defined by the claims appended hereto.

What is claimed is:

1. Apparatus for producing spray dried particulates from a concentrated aqueous slurry, comprising:
   a spray dryer,
   means for delivering hot gases to dry atomized particles in said spray dryer,
   a non-evaporated device for concentrating a feed slurry;
   an evaporative system for concentrating slurry from said non-evaporative device;
   a first heat exchanger for heating said feed slurry, said first heat exchanger being heated by a first fluid;
   a second heat exchanger for heating slurry from said non-evaporative device, said second heat exchanger being heated by a second fluid;
   heat recovery means for heating said first and second fluids;
   means for moving sad first and second fluids between said heat recovery means and said first and second heat exchangers, respectivley,
   means for withdrawing hot gases from said spray dryer and delivering at least part of said hot gases to said heat recovery means to heat said first and second fluids,
   means for delivering said feed slurry to said first heat exchanger and said non-evaporative device to heat said feed slurry and increase the solids content of said feed slurry;
   means for delivering said heated slurry having an increased solids content to said second heat exchanger and said evaporative system to separate water vapor from said heated slurry;
   means for delivering said heated slurry from said evaporative system to an atomizer in said spray dryer, and
   means for withdrawing a dried particulate product from said spray dryer.

2. The apparatus for producing spray dried particulates as defined by claim 1, wherein said heat recovery means comprises:
   a first heat recovery unit for heating said second fluid for said second heat exchanger,
   a second heat recovery unit for heating said first fluid for said first heat exchanger, and
   said means for withdrawing hot gases from spray dryer includes means for delivering said hot gases to said first heat recovery unit and means for delivering gases exiting from said first heat recovery unit to said second heat recovery unit.

3. The apparatus for producing spray dried particulates as defined by claim 1 and further comprising: means for delivering part of said hot gases withdrawn from said spray dryer to said means for delivering hot gases to dry atomized particles in said spray dryer.

4. The apparatus for producing spray dried particulates as defined by claim 1, wherein said evaporative system includes at least one non-evaporative heat exchanger heated by said first fluid and a flash chamber.

5. The apparatus for producing spray dried particulates as defined by claim 4, wherein said evaporative system includes a second non-evaporative heat exchanger and a flash chamber.

6. The apparatus for producing spray dried particulates as defined by claim 1 wherein said non-evaporative device is a liquid/solids separating device.

7. The apparatus for producing spray dried particulates as defined as claim 6 wherein said liquid/solids separating device is a drum filter.

8. The apparatus for producing spray dried particulates as defined by claim 6 wherein said liquid/solids separating device is a centrifuge.

9. The apparatus for producing spray dried particulates as defined by claim 1 including means in said means for delivering said heated slurry from said evaporative system to said atomizer for withdrawing said concentrated heat slurry from said apparatus.

10. Apparatus for producing spray dried particulates from a concentrated aqueous slurry, comprising:
    a spray dryer,
    means for delivering hot gases to dry atomized particles in said spray dryer,
    a permeable membrane liquid/solids separating device for concentrating a feed slurry;
    an evaporative system for concentrating slurry from said permeable membrane liquid/solids separating device;
    a first heat exchanger for heating said feed slurry, said first heat exchanger being heated by a fluid;
    a second heat exchanger for heating slurry from said permeable membrane liquid/solids separating device, said second heat exchanger being heated by a second fluid;
    heat recovery means for heating said fluids;
    means for moving said fluids between said heat recovery means and said first and second heat exchangers, respectively,
    means for withdrawing hot gases from said spray dryer and delivering at least part of said hot gases to said heat recovery means to heat said fluids,
    means for delivering said feed slurry to said first heat exchanger and said permeable membrane liquid/solids separating device to heat said feed slurry and increase the solids content of said feed slurry;
    means for delivering said heated slurry having an increased solids content to said second heat exchanger and said evaporative system to separate water vapor from said heated slurry;
    means for delivering said heated slurry from said evaporative system to an atomizer in said spray dryer, and
    means for withdrawing a dried particulate product from said spray dryer.

* * * * *